US012770807B2

(12) United States Patent
Fan et al.

(10) Patent No.: US 12,770,807 B2
(45) Date of Patent: Oct. 20, 2026

(54) ELECTRONIC DEVICE AND BUTTON THEREOF

(71) Applicant: GUANGDONG OPPO MOBILE TELECOMMUNICATIONS CORP., LTD., Dongguan (CN)

(72) Inventors: Wei Fan, Dongguan (CN); Jingzhuo Geng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 417 days.

(21) Appl. No.: 18/354,030

(22) Filed: Jul. 18, 2023

(65) Prior Publication Data

US 2023/0360868 A1 Nov. 9, 2023

Related U.S. Application Data

(63) Continuation of application No. PCT/CN2021/135431, filed on Dec. 3, 2021.

(30) Foreign Application Priority Data

Jan. 29, 2021 (CN) ......................... 202110134470.7
Jan. 29, 2021 (CN) ......................... 202120274987.1

(51) Int. Cl.
*H01H 13/14* (2006.01)
*H01H 13/06* (2006.01)
*H01H 13/26* (2006.01)

(52) U.S. Cl.
CPC ............ *H01H 13/14* (2013.01); *H01H 13/06* (2013.01); *H01H 13/26* (2013.01); *H01H 2223/04* (2013.01); *H01H 2231/028* (2013.01)

(58) Field of Classification Search
CPC ...... H05K 5/02; H05K 5/0086; H05K 5/0091; H01H 2223/04; H01H 2223/044;
(Continued)

(56) References Cited

U.S. PATENT DOCUMENTS 12,112,901 B2 * 10/2024 Fan ...................... H05K 5/0217

FOREIGN PATENT DOCUMENTS

CN 205211635 5/2016
CN 205744771 11/2016
(Continued)

OTHER PUBLICATIONS

CNIPA, Second Office Action for CN Application No. 202110134470.7, Mar. 21, 2025.

(Continued)

*Primary Examiner* — Anthony R Jimenez
(74) *Attorney, Agent, or Firm* — Hodgson Russ LLP

(57) ABSTRACT

A button and an electronic device provided with the button are provided in the disclosure. The button is mounted to a housing of the electronic device and slidable relative to the housing. The button is provided with a connecting portion at one end and a hook at the other end. The connecting portion protrudes from the button in a direction perpendicular to a direction in which the button is slidable. The housing defines a button groove for accommodating the button. The button groove defines a guide groove on a side wall of the button groove. The connecting portion is accommodated in the guide groove and slidable in the guide groove along with movement of the button.

19 Claims, 15 Drawing Sheets

(58) Field of Classification Search
CPC .. H01H 2231/028; H01H 13/06; H01H 13/14; H01H 13/26; H01H 2221/03; H01H 2223/002; H01H 3/122; H01H 9/04; H01H 9/041; H01H 9/22; H01H 9/24; H01H 2201/01; H01H 2223/03; H01H 2223/034; H01H 9/0214; H01H 9/0264; H01H 9/0271; H01H 2009/0285
USPC .......................................................... 200/341
See application file for complete search history.

(56) References Cited

FOREIGN PATENT DOCUMENTS

| | | |
|---|---|---|
| CN | 110138946 | 8/2019 |
| CN | 110138949 | 8/2019 |
| CN | 111901998 | 11/2020 |
| CN | 212163894 | 12/2020 |
| WO | 2018018605 | 2/2018 |

OTHER PUBLICATIONS

WIPO, International Search Report and Written Opinion for International Application No. PCT/CN2021/135431, Mar. 1, 2022.
CNIPA, First Office Action for CN Application No. 202110134470.7, Nov. 29, 2024.
CNIPA, Third Office Action for CN Application No. 202110134470.7, Jun. 28, 2025.

* cited by examiner

ELECTRONIC DEVICE AND BUTTON THEREOF

CROSS-REFERENCE TO RELATED APPLICATION(S)

The application is a continuation of International Application No. PCT/CN2021/135431, filed Dec. 3, 2021, which claims priority to Chinese Patent Application No. 202110134470.7, filed Jan. 29, 2021, and priority to Chinese Patent Application No. 202120274987.1, filed Jan. 29, 2021. The entire disclosures of the aforementioned applications are incorporated herein by reference.

TECHNICAL FIELD

The disclosure relates to the field of electronic devices, and in particular, to a button and an electronic device provided with the button.

BACKGROUND

Existing electronic devices are provided with buttons for controlling the electronic devices. The button is slidably disposed at a housing of the electronic device, and the button can slide relative to the housing to abut against or be disengaged from a switch. Currently, the button is typically provided with a clamping ring at one end of a button post, and the clamping ring abuts against and is limited by a limiting portion, so that the button can be prevented from detaching from the housing of the electronic device, thereby ensuring security of the button.

However, the existing buttons are complex in structure, and the housing has a limited installation space for the button, and thus it is difficult to assemble the button.

SUMMARY

The disclosure aims to provide a button which is easy to be assembled and an electronic device provided with the button.

In order to solve the above technical problem, a button is provided. The button is mounted to a housing of an electronic device and slidable relative to the housing. The button is provided with a connecting portion at one end and a hook at the other end, the connecting portion protrudes from the button in a direction perpendicular to a direction in which the button is slidable, and the housing defines a button groove for accommodating the button. The button groove defines a guide groove on a side wall of the button groove, the connecting portion is accommodated in the guide groove and slidable in the guide groove along with movement of the button, and the hook is limited in the button groove by a locking member.

An electronic device is further provided in the disclosure. The electronic device includes a housing and the button. The housing defines the button groove and the guide groove in communication with the button groove. The button is accommodated in the button groove, the connecting portion of the button is accommodated in the guide groove, and the hook of the button is limited in the button groove by the locking member.

BRIEF DESCRIPTION OF THE DRAWINGS

To describe technical solutions in implementations of the disclosure more clearly, the following briefly introduces the accompanying drawings required for describing the implementations. Apparently, the accompanying drawings in the following description only illustrate some implementations of the disclosure. Those of ordinary skill in the art may also obtain other drawings based on these accompanying drawings without creative efforts.

DETAILED DESCRIPTION

Figure 1:
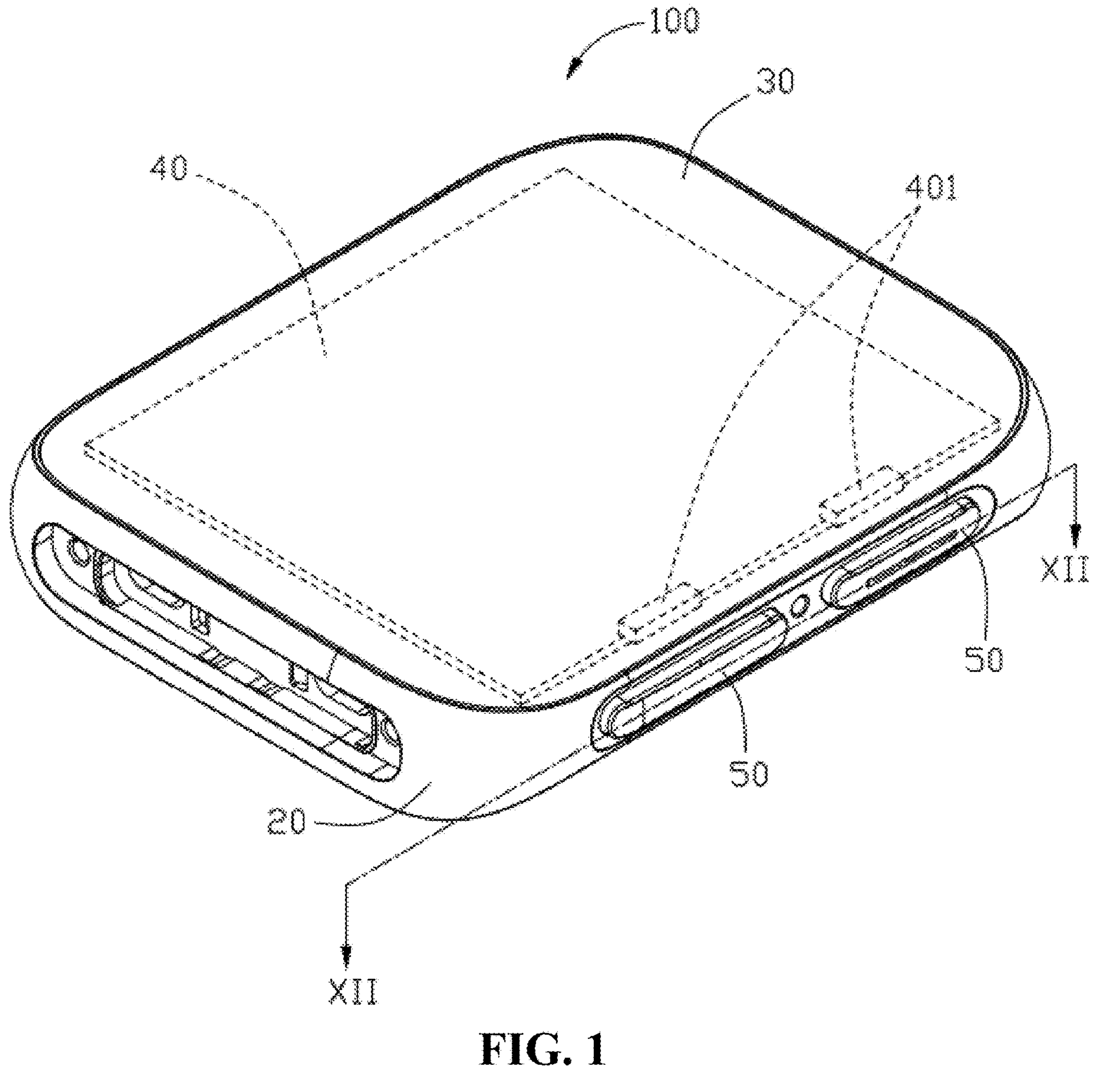
FIG. 1 is a schematic perspective structural view of an electronic device according to an implementation of the disclosure.

A button is provided. The button is mounted to a housing of an electronic device and slidable relative to the housing. The button is provided with a connecting portion at one end and a hook at the other end. The connecting portion protrudes from the button in a direction perpendicular to a direction in which the button is slidable. The housing defines a button groove for accommodating the button. The button groove defines a guide groove on a side wall of the button groove. The connecting portion is accommodated in the guide groove and slidable in the guide groove along with movement of the button. The hook is limited in the button groove by a locking member.

The housing defines a positioning hole corresponding to the locking member. The locking member includes a connecting rod and a positioning portion disposed on an outer periphery of the connecting rod. The connecting rod is inserted into the positioning hole. The positioning portion is in interference fit with the positioning hole.

The housing defines an accommodation groove corresponding to the hook. The locking member extends through the hook and is positioned in the positioning hole. The hook is limited in the accommodation groove.

The positioning hole is in communication with the accommodation groove. One end of the positioning hole is defined on a top surface of the housing or a bottom surface of the housing. The locking member is inserted into the positioning hole from the top surface of the housing or the bottom surface of the housing.

The locking member is positioned in the positioning hole, and one end of the positioning portion is in interference fit with the positioning hole.

The positioning portion is a protrusion surrounding one end of the outer periphery of the connecting rod. The protrusion is provided with guide surfaces respectively at two sides of the protrusion that are arranged opposite to each other in an axial direction of the protrusion.

The guide surface is in smooth transition connection with the outer periphery of the connecting rod.

An outer periphery of the positioning portion is an arc-shaped surface that protrudes outwards. The outer periphery of the positioning portion is in smooth transition connection with the outer periphery of the connecting rod.

The locking member further includes an operating portion. The operating portion includes an extending rod axially extending from an end surface of the connecting rod and an operating piece disposed at one end of the extending rod away from the connecting rod. An outer diameter of the extending rod is smaller than an outer diameter of the connecting rod.

An outer diameter of the operating piece is greater than the outer diameter of the extending rod, and an annular groove is defined between the operating piece and the connecting rod.

The positioning portion is engaged with or adhered to the connecting rod so that the positioning portion is fixed to and sleeved on the connecting rod.

The button further includes a pressing cover that has an inner surface facing the housing. The connecting portion protrudes from the inner surface of the pressing cover. The hook includes a protruding portion protruding from the inner surface of the pressing cover and an extension portion that extends from a distal end of the protruding portion in a direction away from the connecting portion. The pressing cover, the protruding portion, and the extension portion surround a space to define a limiting groove. The locking member extends through the limiting groove.

Two opposite end surfaces of the pressing cover are arc-shaped surfaces.

The button further includes a button post connected to the button. One end of the button post penetrates through the housing and extends into an accommodation space of the housing.

A sealing ring is sleeved on an outer periphery of the button post.

The button includes a connecting pad connecting the button post and the button.

The connecting pad includes a washer and a clamping block protruding from the washer. A positioning hole is defined on the inner surface of the pressing cover of the button and located between the connecting portion and the hook. The clamping block is clamped in the positioning hole.

The connecting pad is elastic, and the connecting pad is made of elastic rubber, plastic, or silica gel.

The button further includes at least one elastic member disposed between the button and the housing.

An electronic device is provided. The electronic device includes a housing and the button. The housing defines the button groove and the guide groove in communication with the button groove. The button is accommodated in the button groove, the connecting portion of the button is accommodated in the guide groove, and the hook of the button is limited in the button groove by the locking member.

The following clearly and completely describes the technical solutions in the implementations of the disclosure with reference to the accompanying drawings in the implementations of the disclosure. Apparently, the described implementations are merely part rather than all of the implementations of the disclosure. The implementations described herein can be combined with each other appropriately. All other implementations obtained by those of ordinary skill in the art based on the implementations of the disclosure without creative efforts shall fall within the protection scope of the disclosure.

In addition, the following illustrations of various implementations are provided with reference to the accompanying drawings to illustrate specific implementations that can be implemented in the disclosure. Directional terms such as “up”, “down”, “front”, “back”, “left”, “right”, “inside”, “outside”, “side”, and the like referred to herein which are only for directions with reference to the accompanying drawings. Therefore, the directional terms used herein are intended to better and more clearly illustrate and understand the disclosure, rather than explicitly or implicitly indicate that devices or elements referred to herein must have a certain direction or be configured or operated in a certain direction and therefore cannot be understood as limitation on the disclosure.

It is noted that, in the illustrations of the disclosure, terms “mount”, “couple”, “connect”, “interconnect”, and “disposed” should be understood in a broad sense unless otherwise expressly specified and limited. For example, the terms “mount”, “couple”, “connect”, “interconnect”, and “disposed” may refer to fixedly connect, detachably connect, or integrally connect, may refer to mechanically connect, and may refer to a directly connect, indirectly connect through an intermediate medium, or an intercommunicate interiors of two elements. For those of ordinary skill in the art, the specific meanings of the above terms in the disclosure can be understood according to specific situations.

Figure 2:
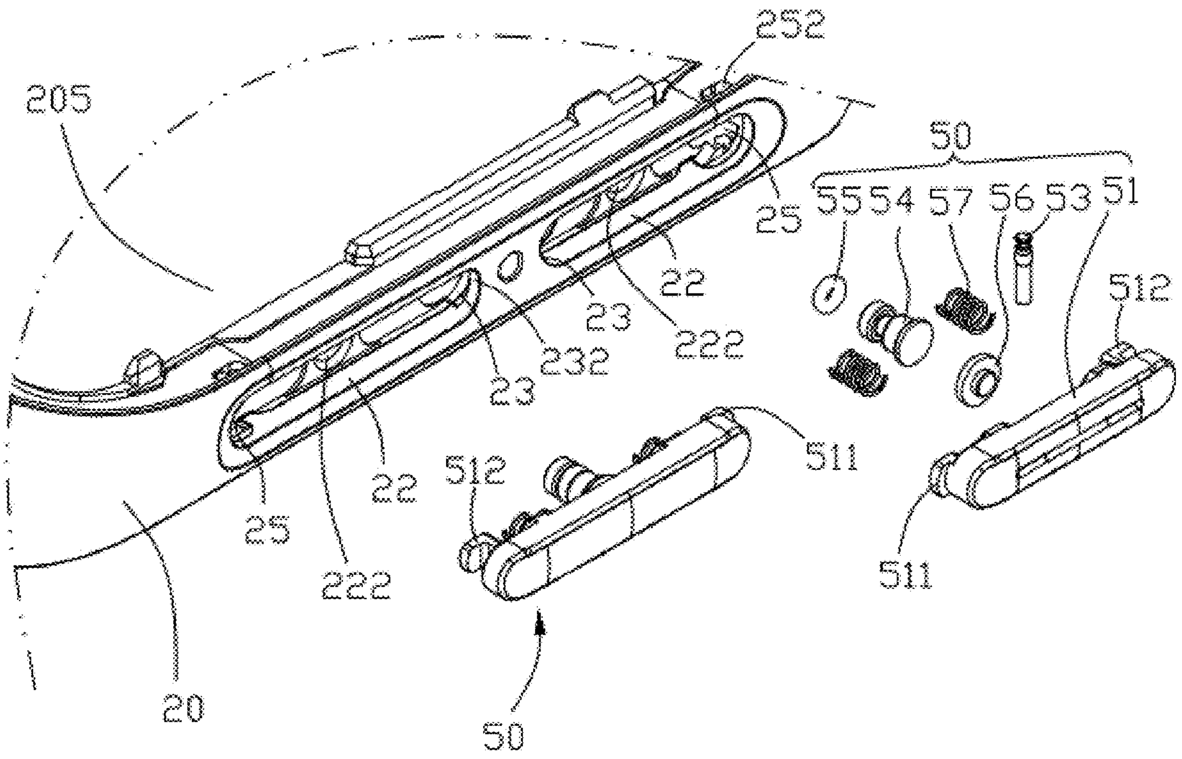
FIG. 2 is a schematic perspective exploded view of part of a housing and a button of the electronic device in FIG. 1.
Figure 3:
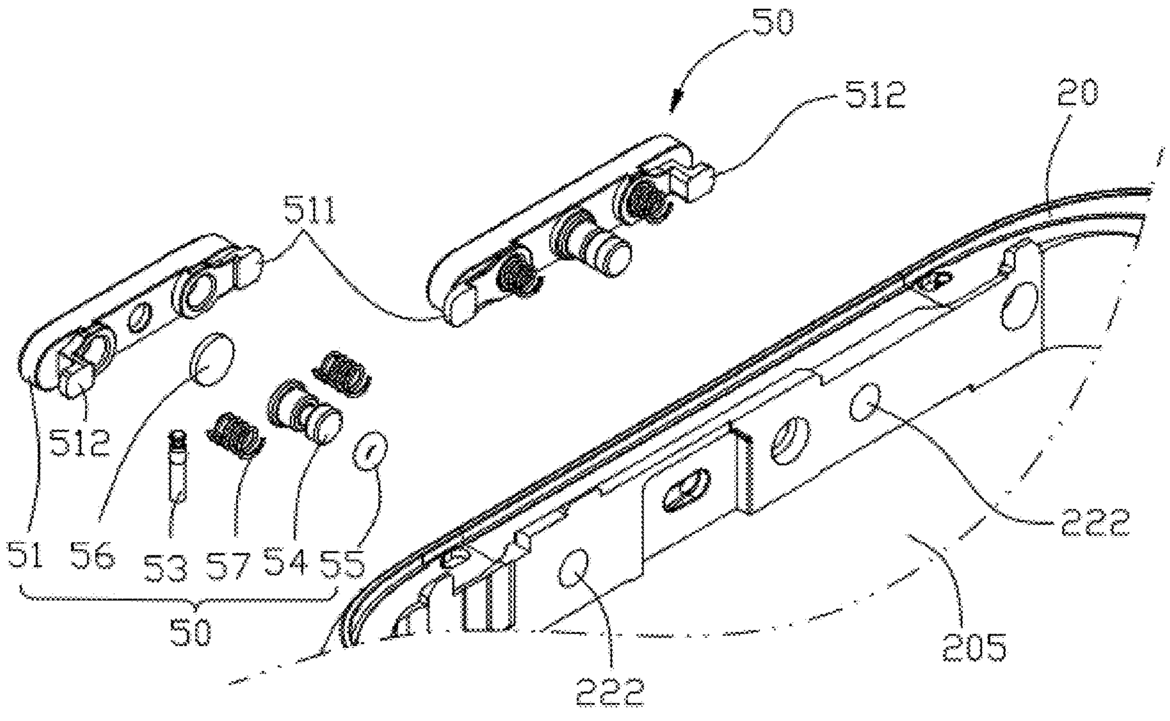
FIG. 3 is a schematic perspective structural view of part of the housing and the button in FIG. 2, viewed from another direction.

Referring to FIGS. 1 to 3, FIG. 1 is a schematic perspective structural view of an electronic device 100 according to an implementation of the disclosure, FIG. 2 is a schematic perspective exploded view of part of a housing 20 and a button 50 of the electronic device 100 in FIG. 1, and FIG. 3 is a schematic perspective structural view of part of the housing 20 and the button 50 in FIG. 2, viewed from another direction. In one implementation of the disclosure, the electronic device 100 includes a housing 20, a display screen 30 disposed on a front face of the housing 20, a mainboard 40 and a power supply that are disposed in the housing 20, and the button 50. The housing 20 defines a button groove 22 for accommodating the button 50, and a guide groove 23 and an accommodation groove 25 that are in communication with the button groove 22. In the implementations, the button groove 22 is a strip-shaped space defined on a side wall of the housing 20. The guide groove 23 and the accommodation groove 25 are located at two opposite ends of the button groove 22, respectively. The button 50 is slidably mounted to the housing 20. In some implementations, the button 50 is slidably accommodated in the button groove 22, that is, the button 50 can slide relative to the housing 20. The button 50 is provided with a connecting portion 511 at one end of the button 50 and a hook 512 at the other end of the button 50, the hook 512 corresponds to the accommodation groove 25, and the connecting portion 511 protrudes from the button 50 in a direction perpendicular to a direction in which the button 50 is slidable. In the implementations, the button 50 includes a button body 51 and a locking member 53. The connecting portion 511 protrudes from one end of the button body 51 in the direction perpendicular to the direction in which the button 50 is slidable, and the hook 512 is disposed at the other end of the button body 51. In some implementations, the direction in which the button 50 is slidable refers to a direction in which the button 50 moves towards an interior of the housing 20 or towards an exterior of the housing 20 along the button groove 22. The connecting portion 511 protrudes outwards from an outer surface of the button 50 in the direction perpendicular to the direction in which the button 50 is slidable. That is, part of the connecting portion 511, extending in the direction perpendicular to the direction in which the button 50 is slidable, exceeds the button 50. Each of the guide groove 23 and the accommodation groove 25 extends in the direction in which the button 50 is slidable. When the button 50 is mounted to the housing 20, the button body 51 is at least partially accommodated in the button groove 22, the connecting portion 511 is at least partially accommodated in the guide groove 23, and the hook 512 is limited in the button groove 22 by the locking member 53. In some implementations, the hook 512 is limited in the accommodation groove 25 by the locking member 53. The connecting portion 511 slides in the guide groove 23 along with movement of the button body 51, the hook 512 slides in the accommodation groove 25 along with movement of the button body 51, the hook 512 is limited by the locking member 53, and the connecting portion 511 is limited between two inner side surfaces of the guide groove 23 that are opposite to each other.

The mainboard 40 is electrically connected to the display screen 30 and the power supply. The power supply is configured to power the mainboard 40 and the display screen 30. The mainboard 40 is provided with electronic elements such as a processor, a resistor, a capacitor, an inductor, a diode, a triode, and a switch 401. The switch 401 faces the button 50, in other words, the switch 401 can be turned on/off by operating the button 50. In some implementations, when the button body 51 is pressed to drive the button 50 to slide relative to the housing 20, the button 50 can abut against the switch 401 to turn on/off the switch 401. In the implementations, the front face of the housing 20 faces the same direction as a light-outgoing surface of the display screen 30, and a rear face of the housing 20 faces away from the light-outgoing surface of the display screen 30.

The electronic device 100 in the disclosure may be, but is not limited to, a terminal device such as a mobile phone, a tablet computer, and a notebook computer, and may also be a smart wearable device such as a smart watch, a smart earphone, and smart glasses. The button 50 may be, but is not limited to, a switch button, a volume adjustment button, and the like. When being pressed, the button 50 may slide towards the interior of the housing 20, so that the button 50 can trigger a signal-triggering element inside the housing 20. When a pressing force applied to the button 50 is removed, the connecting portion 511 abuts against the inner side surface of the guide groove 23 and the hook 512 abuts against the locking member 53, so that the button 50 can be prevented from detaching from the housing 20, thereby ensuring the safety of the button 50. In the implementations, the electronic device 100 is a smartwatch, and there are two buttons 50 disposed on a side wall of a housing of the smartwatch.

In other implementations, the electronic device 100 may be provided with one or more buttons 50 as required.

The button 50 provided in the disclosure includes the button body 51. The connecting portion 511 and the hook 512 are disposed at two opposite ends of the button body 51, respectively. To mount the button 50 to the housing 20, the connecting portion 511 is directly inserted into the guide groove 23, then the hook 512 is accommodated in the accommodation groove 25, and the hook 512 is limited in the button groove 22 of the housing 20 by the locking member 53. The button 50 is simple and reliable in structure, and is easy to be manufactured and assembled. One end of the button body 51 is directly connected to the housing 20 through the connecting portion 511, the other end of the button body 51 is connected to the housing 20 through the hook 512 and the locking member 53, so that a connection between the button body 51 and the housing 20 is reliable and stable, preventing the button body 51 from detaching from the housing 20. Secondly, with only one locking member 53, the button 50 can be mounted to the housing 20, thereby reducing operation difficulty and operation time, and improving assembly efficiency. In addition, the connecting portion 511 has high structure-processing precision, and can play a limiting role. The connecting portion 511 and the hook 512 can ensure a position of the button body 51 in the button groove 22 of the housing 20, thereby facilitating mounting of the button body 51.

Figure 4:
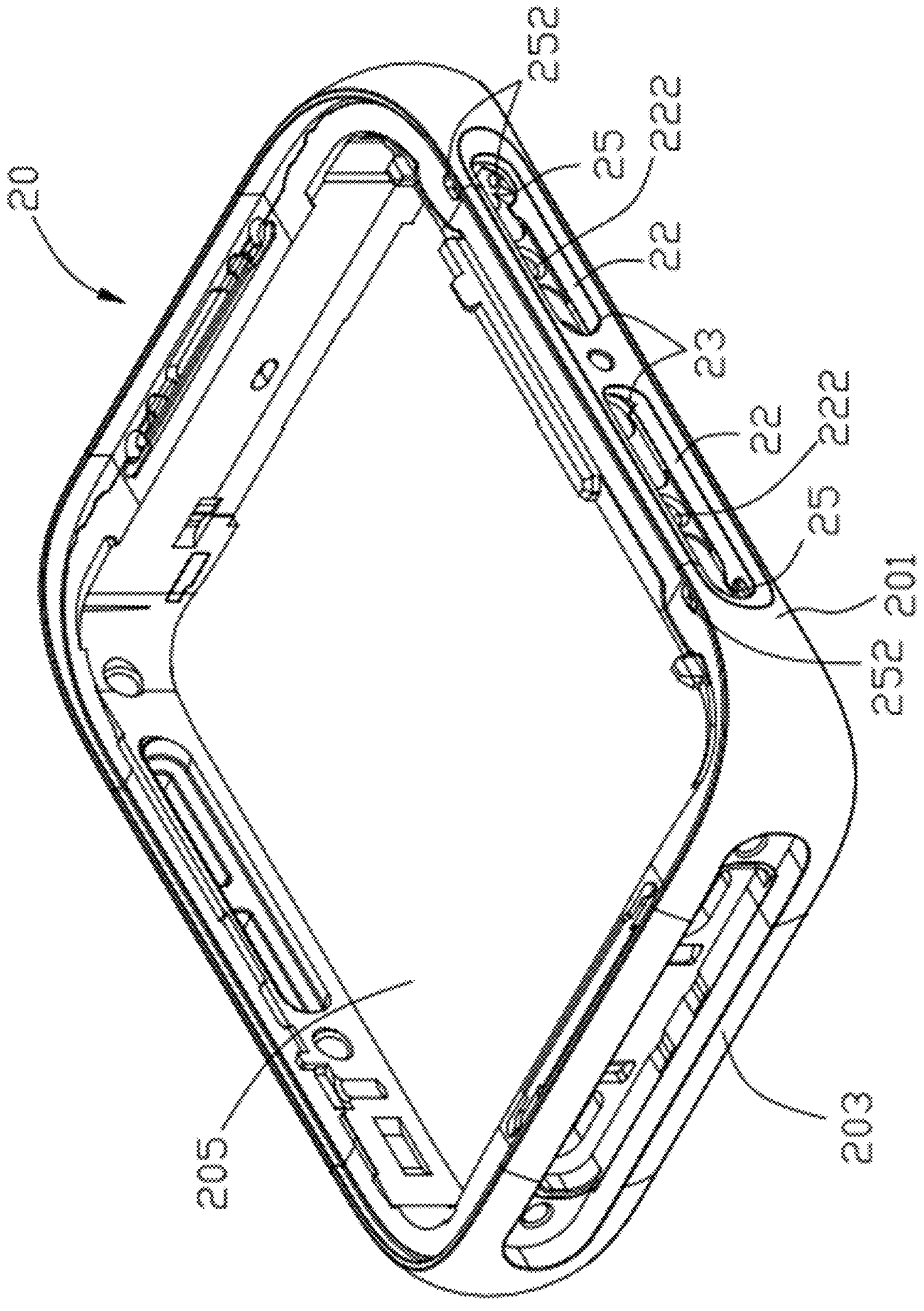
FIG. 4 is a schematic perspective structural view of the housing in FIG. 1.
Figure 5:
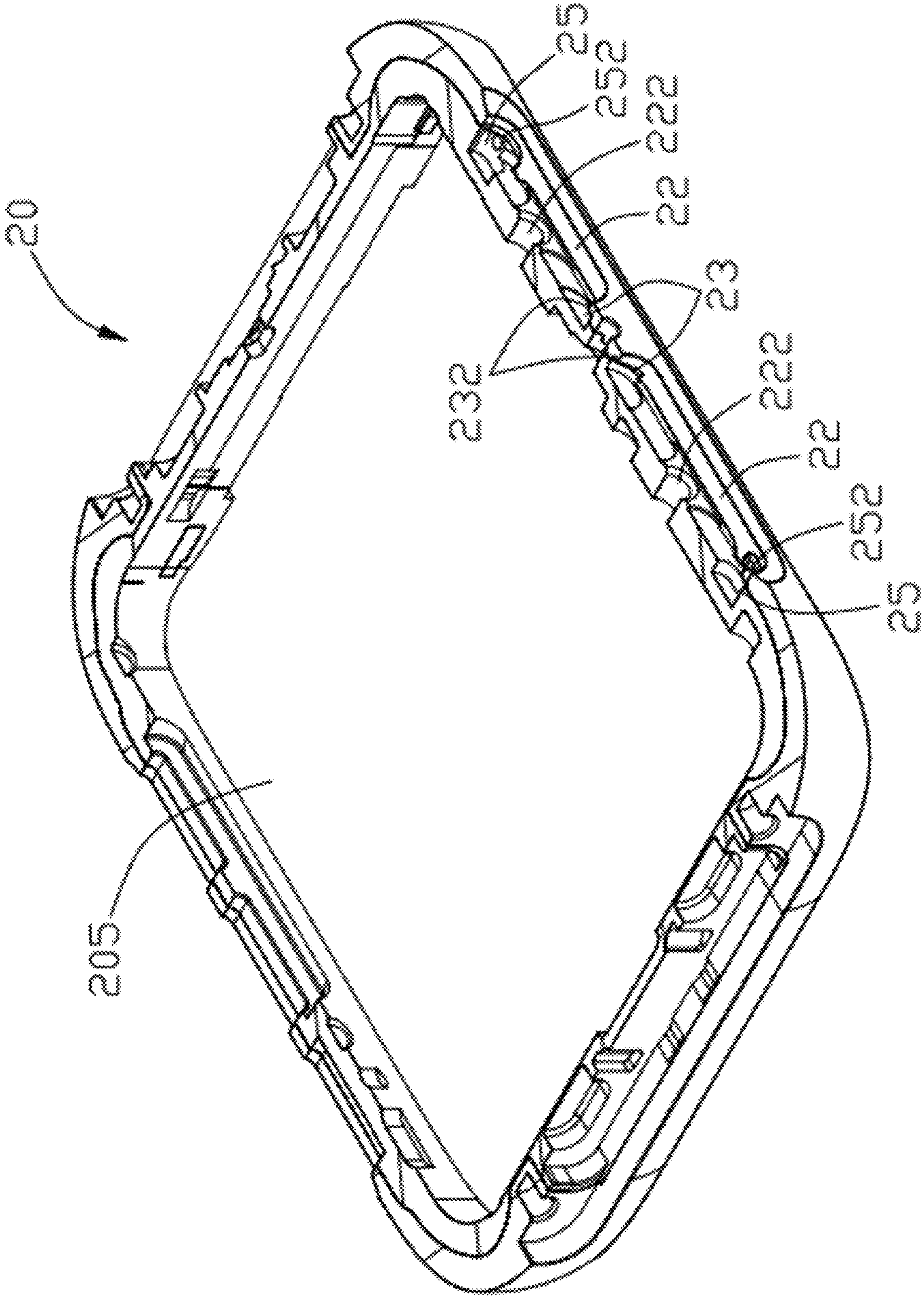
FIG. 5 is a perspective cross-sectional view of the housing in FIG. 4.

Referring to FIG. 4 and FIG. 5, FIG. 4 is a schematic perspective structural view of the housing 20 in FIG. 1, and FIG. 5 is a perspective cross-sectional view of the housing 20 in FIG. 4. The housing 20 includes two side walls 201 opposite each other and two end walls 203 opposite each other, where the two side walls 201 and the two end walls 203 surround a space to define an accommodation space 205. The accommodation space 205 is used to receive electronic elements such as the mainboard 40 and the power supply. There are two button grooves 22 defined on an outer surface of one of the two side walls 201 of the housing 20, each of the button grooves 22 extends in a length direction of the side wall 201, and the two button grooves 22 are arranged in the length direction of the side wall 201. Two opposite ends of each button groove 22 define the guide groove 23 and the accommodation groove 25 respectively at a side of the button groove 22 away from the outer surface of the side wall 201. The guide groove 23 is in communication with the button groove 22. The guide groove 23 extends in a direction away from the accommodation groove 25 and extends in a direction perpendicular to the length direction of the side wall 201. The guide groove 23 does not extend through an inner periphery of the side wall 201, so that the housing 20 has a limiting boss 232 at a position adjacent to the guide groove 23. The accommodation groove 25 is in communication with the button groove 22 and extends in a direction perpendicular to the longitudinal direction of the side wall 201, and the accommodation groove 25 does not extend through the inner periphery of the side wall 201.

The housing 20 defines a positioning hole 252 corresponding to the locking member 53. The positioning hole 252 is in communication with the accommodation groove 25. One end of the positioning hole 252 is defined on a top surface of the housing 20 or a bottom surface of the housing 20. That is, the locking member 53 can be inserted into the positioning hole 252 from the top surface of the housing 20 or the bottom surface of the housing 20. In some implementations, the positioning hole 252 is defined on a front face of the side wall 201 and corresponds to one accommodation groove 25. The positioning hole 252 extends through the accommodation groove 25 in the direction perpendicular to the direction in which the button body 21 is slidable and further extends towards a rear face of the side wall 201, and the positioning hole 252 does not extend through the rear face of the side wall 201. The housing 20 further defines a through hole 222 in communication with each button groove 22 and the accommodation space 205. In some implementations, the through hole 222 is located between the guide groove 23 and the accommodation groove 25, and the through hole 222 extends in a direction perpendicular to the length direction of the side wall 201.

Figure 6:
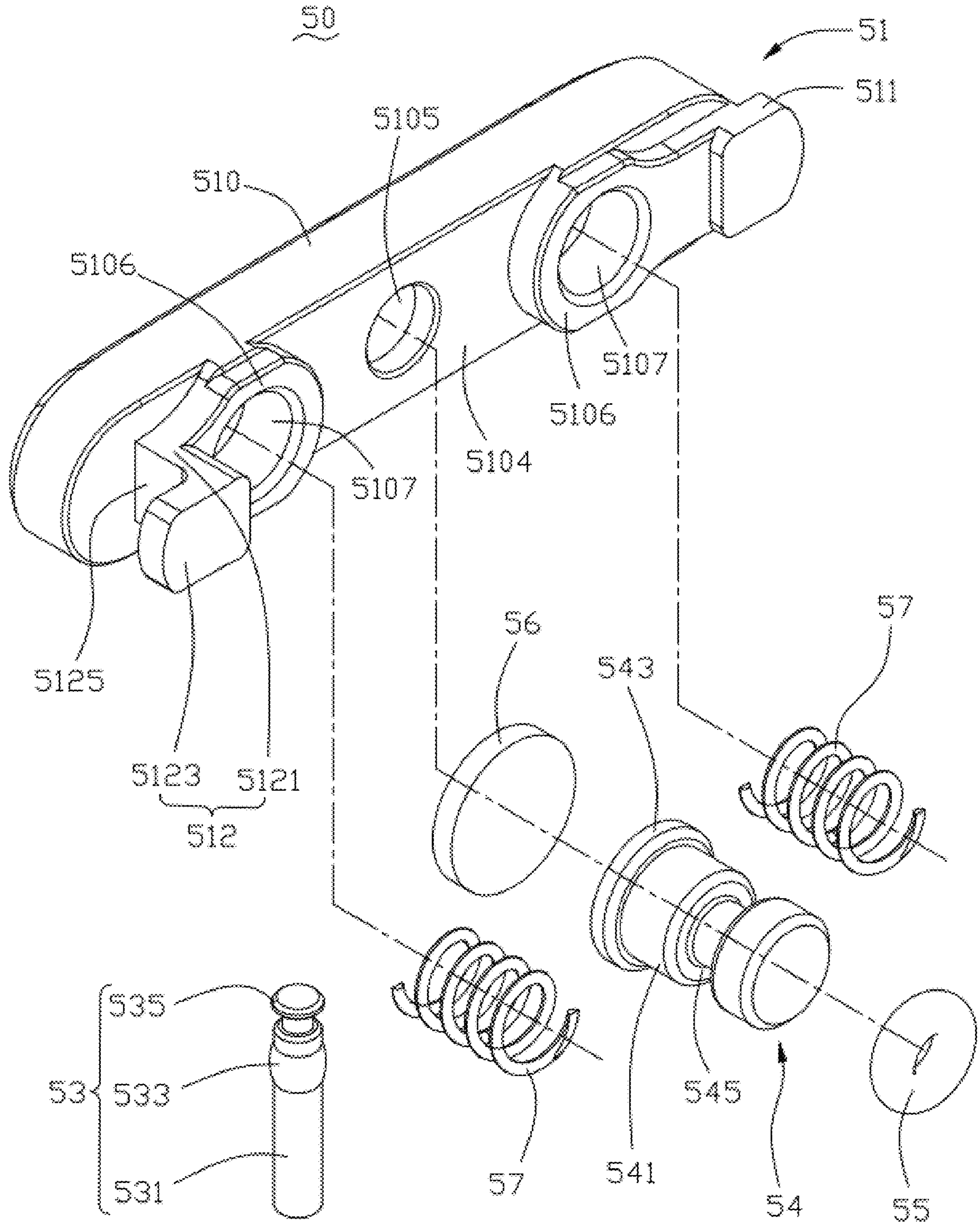
FIG. 6 is a perspective enlarged view of the button in FIG. 3.
Figure 7:
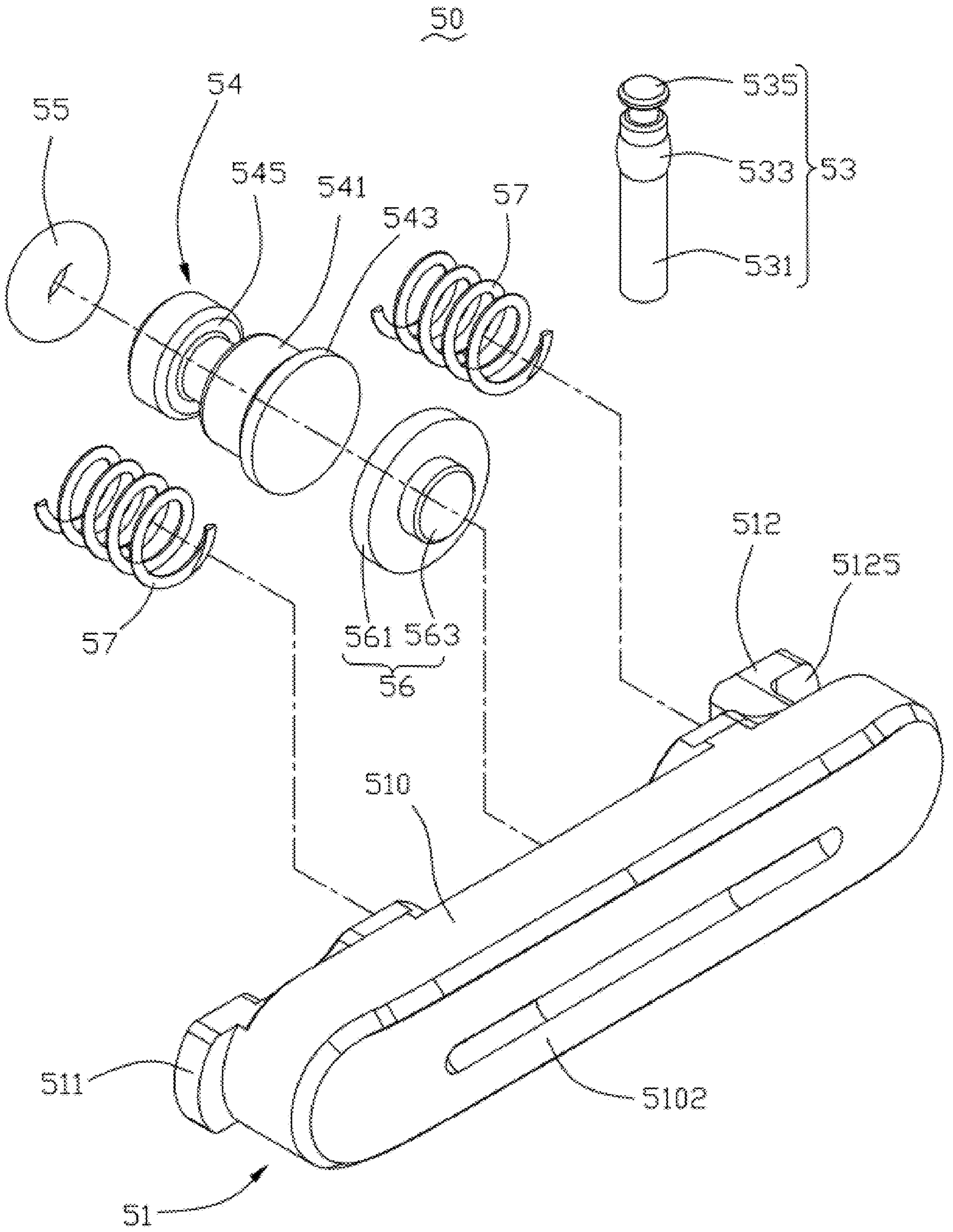
FIG. 7 is a schematic perspective structural view of the button in FIG. 6, viewed from another direction.

Referring to FIG. 2, FIG. 3, FIG. 6, and FIG. 7, FIG. 6 is a perspective enlarged view of the button 50 in FIG. 3, and FIG. 7 a schematic perspective structural view of the button 50 in FIG. 6, viewed from another direction. The button body 51 includes a strip-shaped pressing cover 510. The pressing cover 510 is slidably accommodated in the button groove 22 of the housing 20. Two opposite end surfaces of the pressing cover 510 are arc-shaped surfaces. The connecting portion 511 and the hook 512 are respectively disposed at two opposite ends of the pressing cover 510. The connecting portion 511 is slidably accommodated in the guide groove 23 of the housing 20 and the hook 512 is slidably accommodated in the accommodation groove 25 of the housing 20. The pressing cover 510 has an outer surface 5102 and an inner surface 5104 that faces the housing 20. The connecting portion 511 and the hook 512 are disposed at two opposite ends of the inner surface 5104, respectively. The connecting portion 511 protrudes from the inner surface 5104 of the pressing cover 510. One end of the connecting portion 511 exceeds an end surface of the pressing cover 510 in the direction perpendicular to the direction in which the button 50 is slidable. In some implementations, an end surface of the connecting portion 511 away from the hook 512 is an arc-shaped surface. The hook 512 includes a protruding portion 5121 protruding from the inner surface 5104 of the pressing cover 510 and an extension portion 5123 that extends from a distal end of the protruding portion 5121 in a direction away from the connecting portion 511. The pressing cover 510, the protruding portion 5121, and the extension portion 5123 surround a space to define a limiting groove 5125. A positioning hole 5105 is defined on the inner surface 5104 of the pressing cover 510 and is located between the connecting portion 511 and the hook 512. In some implementations, the positioning hole 5105 is located at a middle position of the inner surface 5104. The pressing cover 510 is provided with connecting barrels 5106 on the inner surface 5104 of the pressing cover 510. The connecting barrels 5106 are close to the connecting portion 511 and the hook 512, respectively, and each of the connecting barrels 5106 defines a connecting hole 5107 extending in an axial direction of the corresponding connecting barrel 5106.

The locking member 53 includes a connecting rod 531 and a positioning portion 533 disposed on an outer periphery of the connecting rod 531. The connecting rod 531 is inserted into the positioning hole 252 of the housing 20. The positioning portion 533 is in interference fit with the positioning hole 252. In some implementations, the positioning portion 533 is located at one end of the outer periphery of the connecting rod 531. The positioning portion 533 may be integrally formed with the connecting rod 531. The positioning portion 533 may also be independent of and sleeved on the connecting rod 531. An outer diameter of the positioning portion 533 is slightly greater than an inner diameter of the positioning hole 252.

In other implementations, the positioning portion 533 is engaged with or adhered to the connecting rod 531 so that the positioning portion 533 is fixed to and sleeved on the connecting rod 531.

Figure 8:
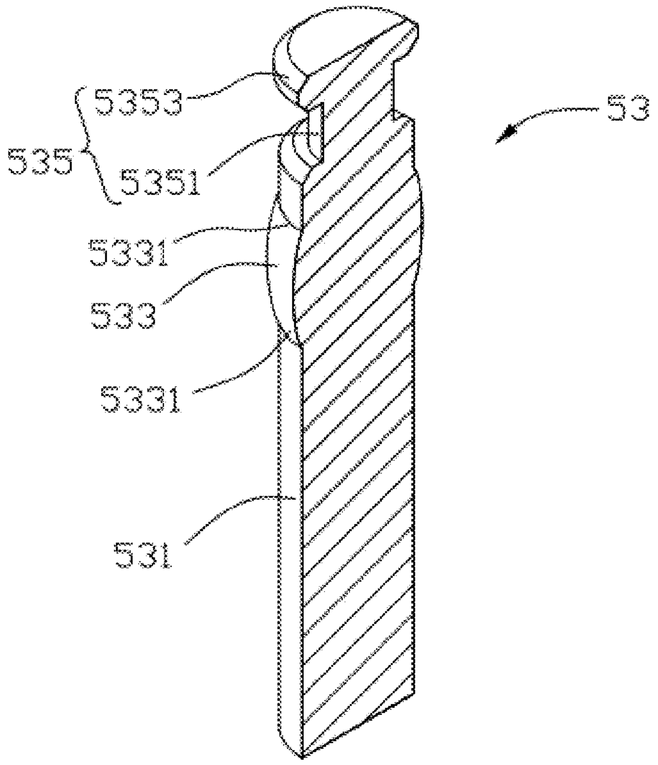
FIG. 8 is a perspective cross-sectional view of a locking member in FIG. 7.

In some implementations, as illustrated in FIG. 8, FIG. 8 is a perspective cross-sectional view of the locking member 53 in FIG. 7. The positioning portion 533 is a protrusion protruding from one end of the outer periphery of the connecting rod 531, and the protrusion surrounds the connecting rod 531. In the implementations, the protrusion surrounds the connecting rod 531, and an axis of the protrusion is collinear with an axis of the connecting rod 531. In some implementations, an outer periphery of the positioning portion 533 is an arc-shaped surface that protrudes outwards, and the outer periphery of the protrusion is in smooth transition connection with the outer periphery of the connecting rod 531.

The locking member 53 further includes an operating portion 535. The operating portion 535 facilitates mounting of the locking member 53 to the housing 20 by a user. In some implementations, the operating portion 535 includes an extension rod 5351 extending from an end surface of the connecting rod 531 in an axial direction of the connecting rod 531, and an operating piece 5353 disposed at one end of the extension rod 5351 away from the connecting rod 531. An outer diameter of the extension rod 5351 is smaller than an outer diameter of the connecting rod 531. The operating piece 5353 may be a circular plate. An outer diameter of the operating piece 5353 is greater than the outer diameter of the extension rod 5351. An annular groove is defined between the operating piece 5353 and the connecting rod 531. With the aid of the annular groove, it facilitates hand-holding of an operator.

As illustrated in FIG. 2, FIG. 3, FIG. 6, and FIG. 7, the button 50 further includes a button post 54 connected to the button body 51. One end of the button post 54 away from the button body 51 penetrates through the housing 20 and extends into the accommodation space 205 of the housing 20, so that the button post 54 can abut against a corresponding switch 401. In some implementations, the button post 54 includes a post body 541 and an abutting piece 543 disposed at one end of the post body 541. The post body 541 defines a positioning groove 545 on an outer periphery of the post body 541 in a peripheral direction of the post body 541.

In some implementations, a sealing ring 55 is sleeved on an outer periphery of the button post 54. The sealing ring 55 is used to prevent external liquid, dust, or foreign matters from entering the accommodation space 205 of the housing 20 through the through hole 222 of the housing 20, thereby preventing electronic elements and the power supply on the mainboard 40 in the housing 20 from being polluted or damaged. In the implementations, the sealing ring 55 is made of an elastic waterproof material. The waterproof material may be, but is not limited to, rubber, plastic, silica gel, or the like. The sealing ring 55 is sleeved in the positioning groove 545 of the post body 541.

In some implementations, the button post 54 and the button body 51 is connected via a connecting pad 56. In some implementations, the connecting pad 56 is elastic, and includes a washer 561 and a clamping block 563 protruding from the washer 561. The washer 561 is used to abut against the abutting piece 543 of the button post 54. The clamping block 563 is clamped in the positioning hole 5105 of the button body 51. In the implementations, the connecting pad 56 is made of an elastic rubber, that is, the connecting pad 56 can be elastically deformed. The button body 51 can move relative to the button post 54, thereby preventing the button post 54 from inclining and being stuck when the button body 51 tilts up, avoiding failure of the button 50, ensuring effective pressability of the button 50, and prolonging service life of the button 50. In other implementations, the connecting pad 56 may be made of elastic plastic, silica gel, or other material.

In some implementations, the button 50 further includes at least one elastic member 57. The at least one elastic member 57 is disposed between the button body 51 and the housing 20. The at least one elastic member 57 is configured to elastically abut against and push the button body 51 to move away from the accommodation space 205 of the housing 20. In the implementations, the button 50 includes two elastic members 57. Each elastic member 57 is a spring and used to provide an elastic restoring force to drive the button body 51 to move away from the housing 20. When the button body 51 is pressed, the elastic member 57 is compressed, the button body 51 moves towards the housing 20, and the button post 54 can trigger the signal-triggering element. When a pressing force applied to the button body 51 is removed, the elastic member 57 applies an elastic force to the button body 51, so that the button body 51 slides in a direction away from the housing 20. When the connecting portion 511 abuts against the inner side surface of the guide groove 23 and the hook 512 abuts against the locking member 53, the elastic member 57 is in a pre-compressed state, so that the button 50 remains depressible.

Optionally, the elastic member 57 is a rectangular spring.

Optionally, the elastic member 57 is a torsion spring.

In other implementations, the elastic member 57 may be an elastic rubber block, an elastic plastic block, or the like.

Figure 9:
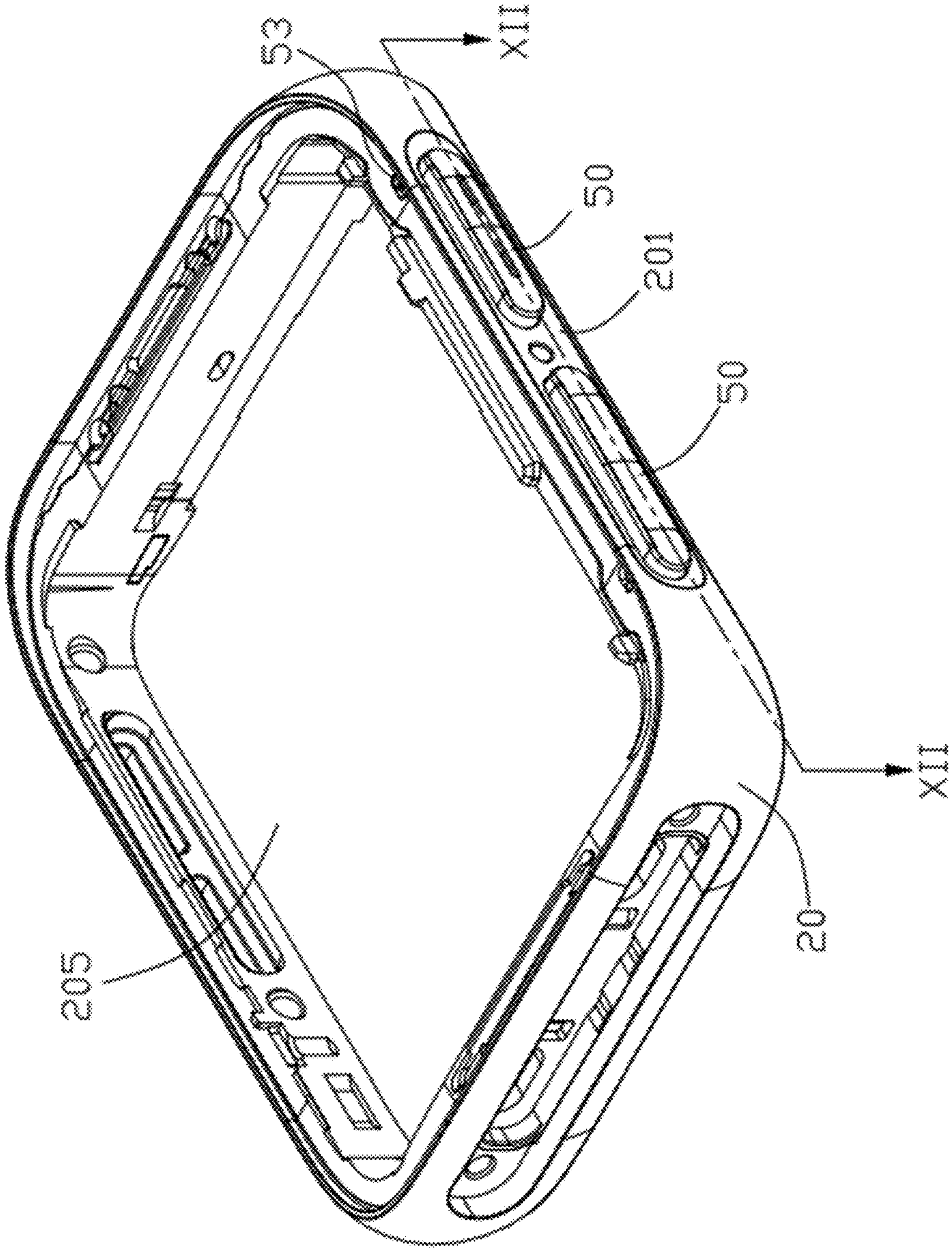
FIG. 9 is a schematic view illustrating the housing and the button in FIG. 1 being assembled together.
Figure 10:
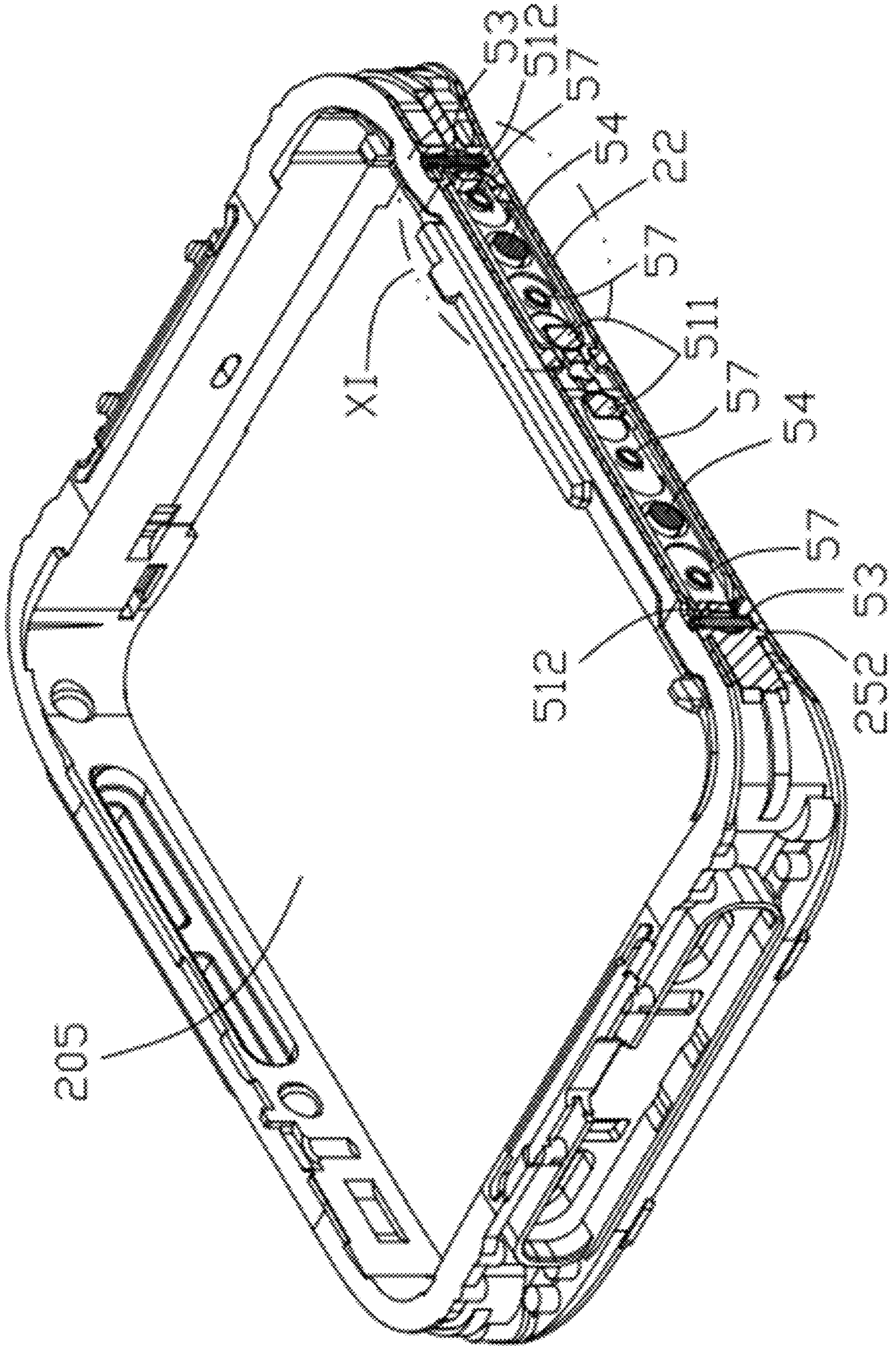
FIG. 10 is a perspective cross-sectional view of the housing and the button in FIG. 9.
Figure 11:
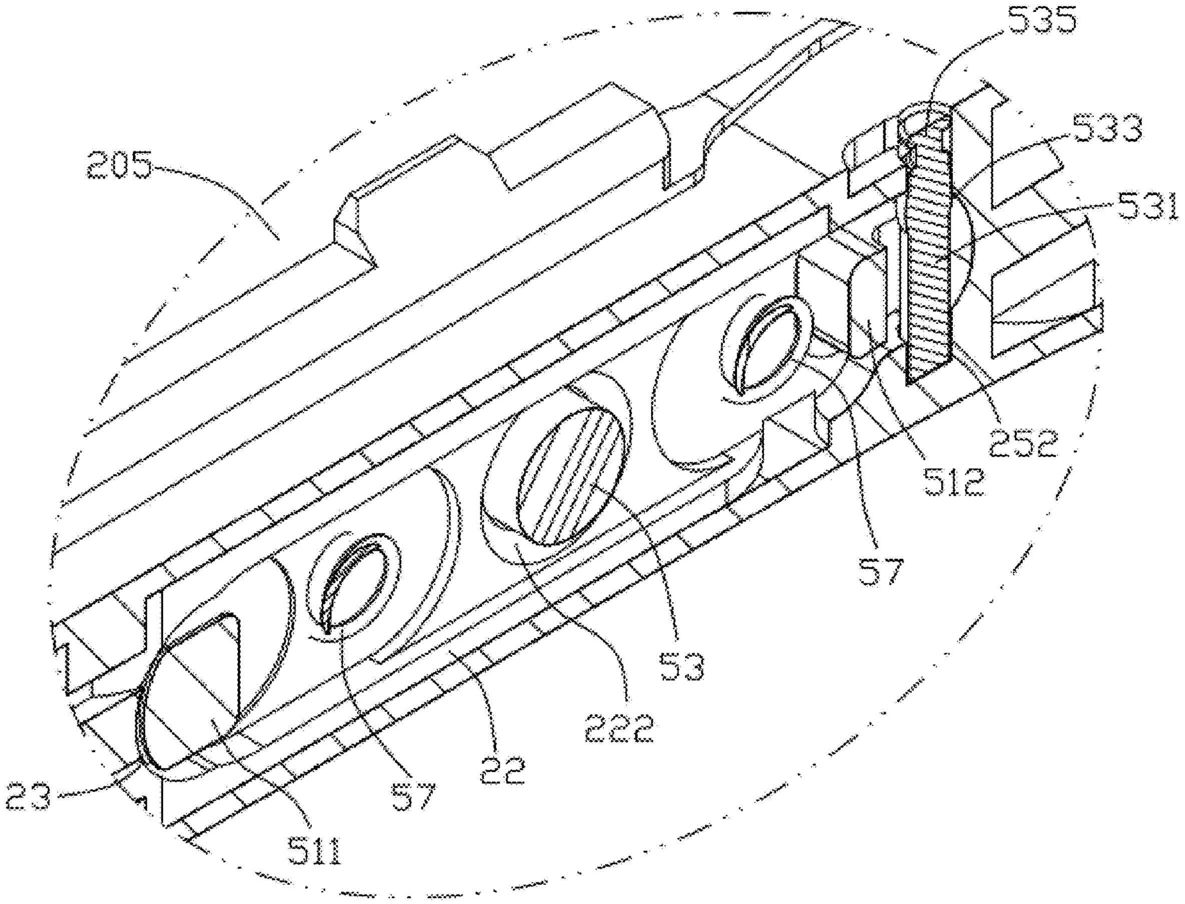
FIG. 11 is an enlarged view of circle XI of FIG. 10.
Figure 12:
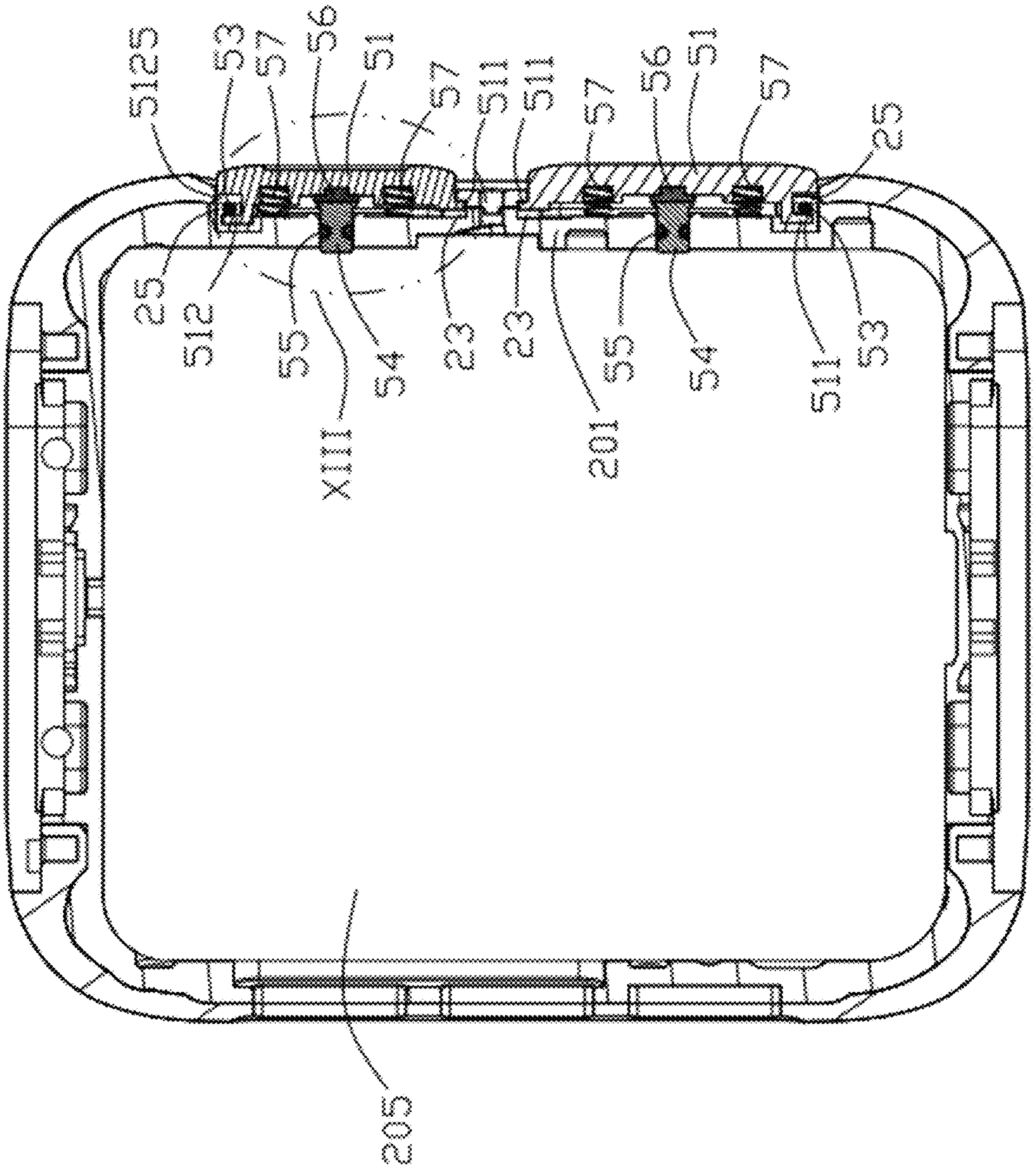
FIG. 12 is a cross-sectional view of FIG. 1, taken along line XII-XII.
Figure 13:
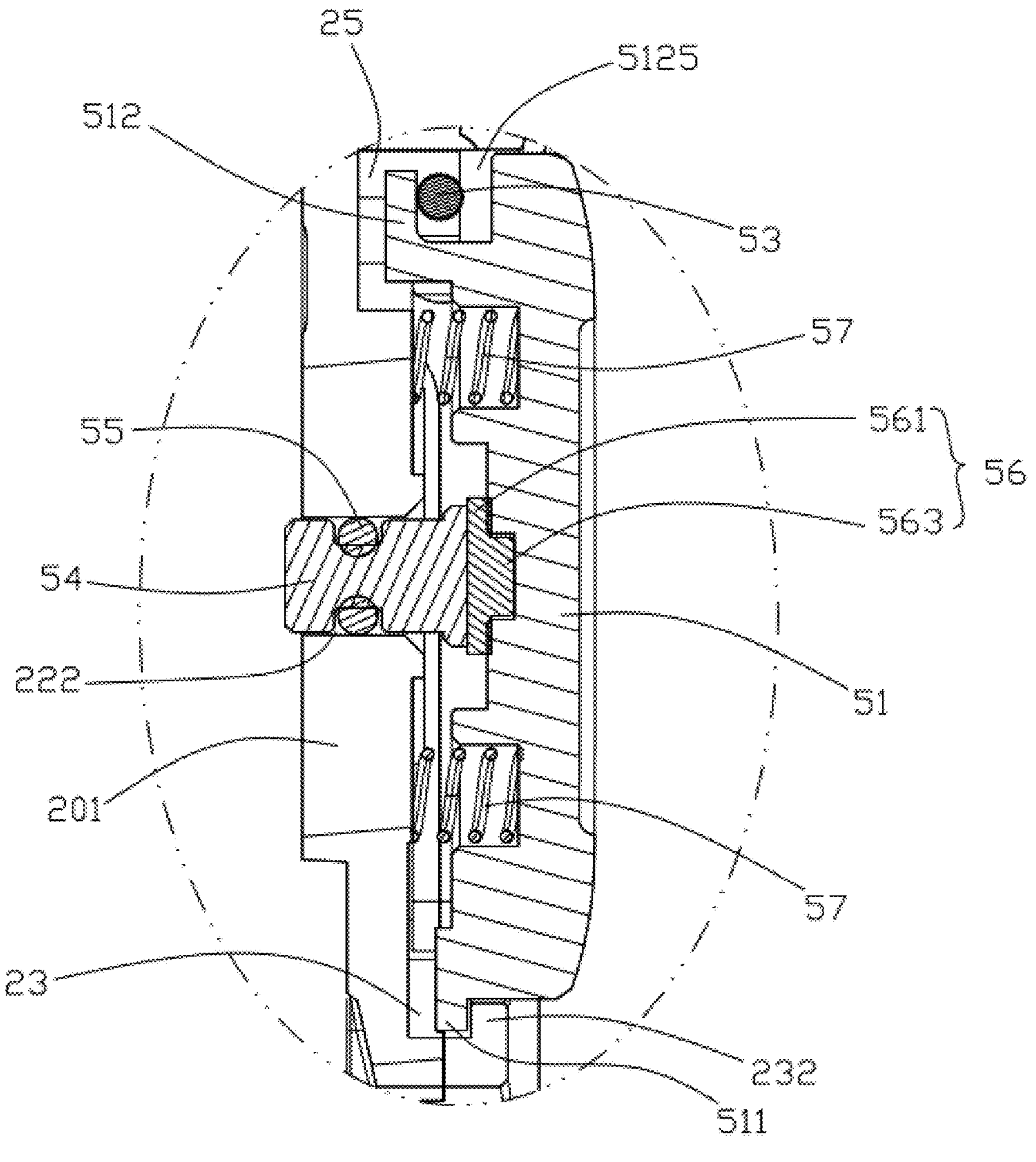
FIG. 13 is an enlarged view of circle XIII of FIG. 12.

Referring to FIG. 2, FIG. 3, and FIGS. 9-13, FIG. 9 is a schematic view illustrating the housing 20 and the button 50 in FIG. 1 being assembled together, FIG. 10 is a perspective cross-sectional view of the housing 20 and the button 50 in FIG. 9, FIG. 11 is an enlarged view of circle XI of FIG. 10, FIG. 12 is a cross-sectional view of FIG. 1, taken along line XII-XII, and FIG. 13 is an enlarged view of circle XIII of FIG. 12. To assemble the button 50 to the housing 20, the sealing ring 55 is sleeved in the positioning groove 545 of the button post 54, one end of the button post 54 away from the abutting piece 543 passes through the button groove 22 and is inserted into the through hole 222 of the housing 20, and the sealing ring 55 is clamped between an inner periphery of the through hole 222 and the button post 54, so that the sealing ring 55 can seal the through hole 222; the clamping block 563 of the connecting pad 56 is clamped in the positioning hole 5105 of the button body 51; one end of each elastic member 57 is clamped in the connecting hole 5107 of a corresponding connecting barrel 5106; the connecting portion 511 of the button body 51 passes through the button groove 22 and is inserted into the guide groove 23, and the hook 512 passes through the button groove 22 and is inserted into the accommodation groove 25, and then, the connecting rod 531 of the locking member 53 is inserted into the positioning hole 252 from the front face of the housing 20 and extends through the limiting groove 5125 of the hook 512. With guiding of a guide surface 5331, the positioning portion 533 is easily inserted into the positioning hole 252, so that the positioning portion 533 can extend through the positioning hole 252 on the front face of the housing 20 and be positioned in the positioning hole 252, and in this case, the locking member 53 extends through the limiting groove 5125 of the hook 512.

In this case, the button body 51 is slidably mounted in the button groove 22, and the connecting portion 511 can slide along the guide groove 23, the hook 512 can slide along the accommodation groove 25, and the elastic member 57 elastically abuts against the button body 51, so that the connecting portion 511 abuts against the limiting boss 232 and the hook 512 abuts against the locking member 53, and thus the connecting portion 511 is limited in the guide groove 23 and the hook 512 is limited in the accommodation groove 25. The locking member 53 is positioned in the positioning hole 252, one end of the positioning portion 533 is in interference fit with the positioning hole 252, so that the locking member 53 can play a limiting role, and thus looseness and detachment of the locking member 53 during subsequent use or falling of the electronic device 100 can be avoided to prevent the button body 51 from detaching from the housing 20, thereby improving the connection of the button 50 to the housing 20, that is, the button 50 can be securely connected to the housing 20. In addition, since the positioning portion 533 is a protrusion protruding from the outer periphery of the connecting rod 531, there will be a noticeable snap sensation when the locking member 53 is assembled in place, and thus it is easy for an installer to determine whether the locking member 53 is assembled in place. Furthermore, the locking member 53 has a high maintainability and has no impact on after-sale maintenance.

Compared with that multiple pins are required to mount a button in the related art to a housing, in the disclosure, with only one locking member 53, the button 50 can be stably mounted to the housing 20, and thus it is simple to assemble the button 50, and less time is spent, thereby improving the assembling efficiency. In addition, in the related art a pin is blindly installed to a pin hole, and thus the pin cannot be quickly and accurately inserted into the pin hole, and further the pin may not be assembled in place, which affects the tactile feedback and usability of a button. In the disclosure, the locking member 53 cooperates with the limiting groove 5125 of the button body 51 to position the button body 51 to the housing 20, and a width of the limiting groove 5125 is far greater than an outer diameter of the locking member 53, so that the locking member 53 can be quickly and accurately mounted in the limiting groove 5125, and thus it is easy for an installer to perform assembling and less time is spent, thereby improving the assembling efficiency, avoiding a situation where the button cannot be assembled in place, and improving the tactile feedback and the use quality.

Figure 14:
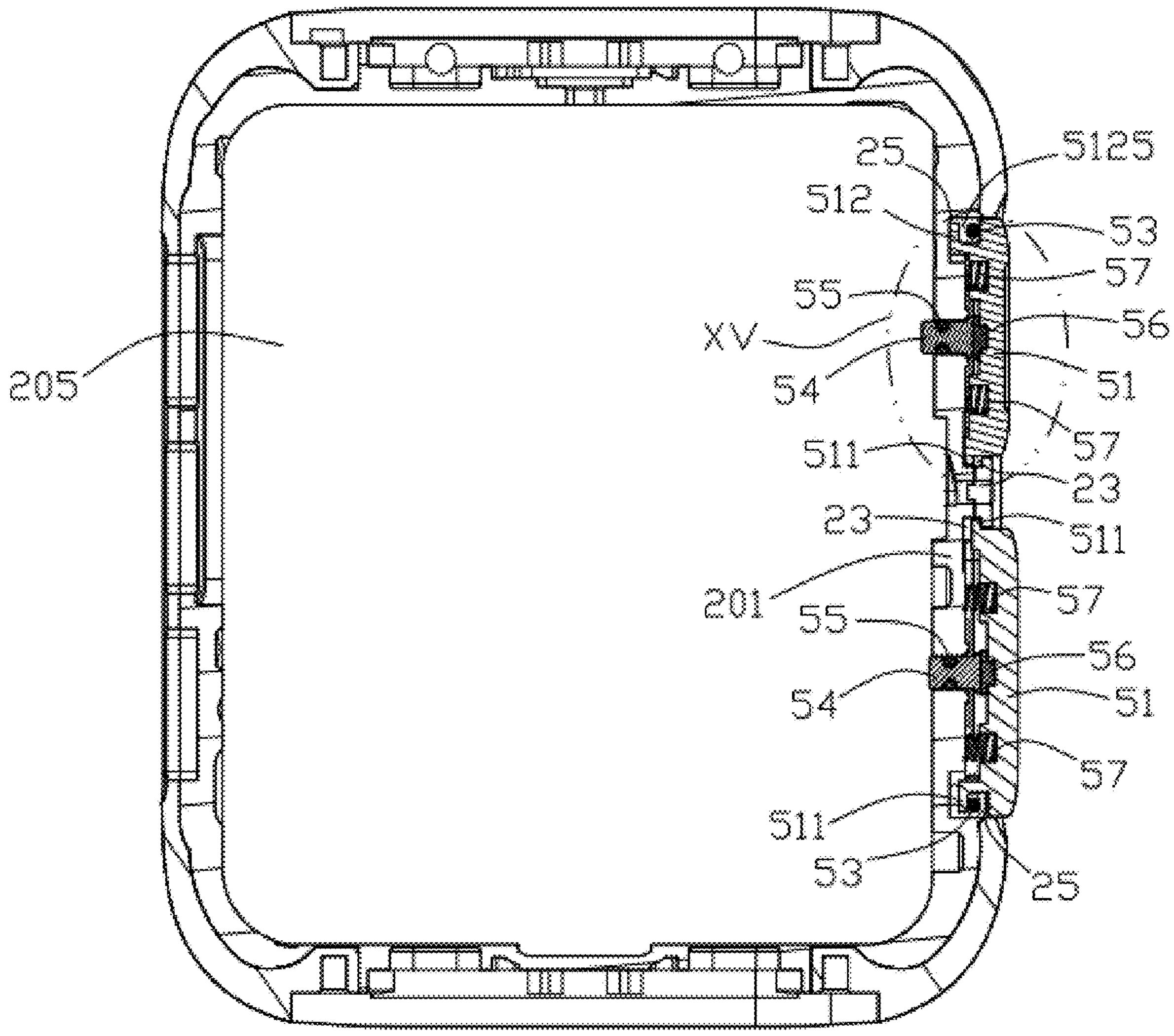
FIG. 14 is a schematic view of a button in FIG. 12 in a pressed state.
Figure 15:
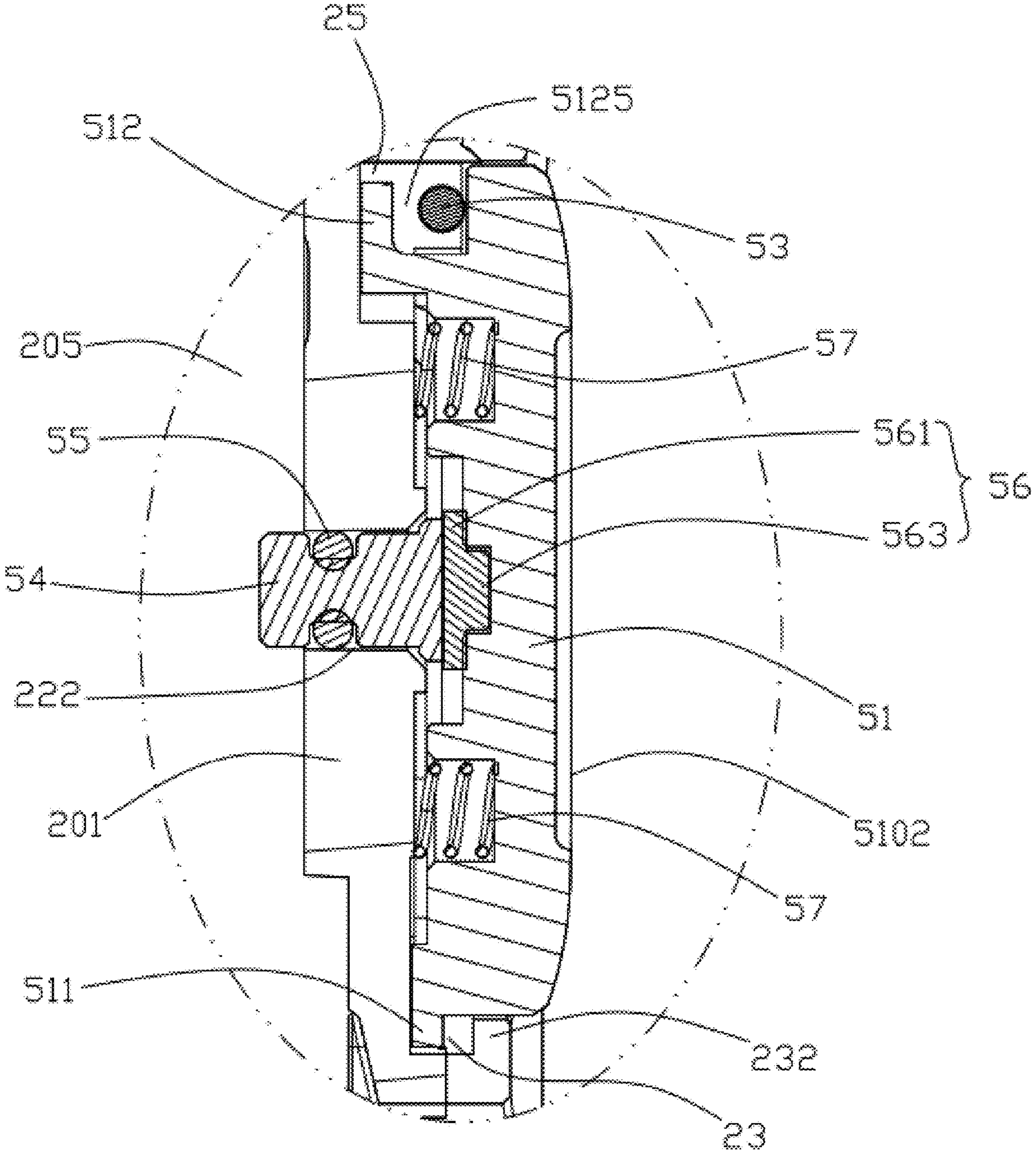
FIG. 15 is an enlarged view of circle XV of FIG. 14.

Referring to FIG. 14 and FIG. 15, FIG. 14 is a schematic view of a button in FIG. 12 in a pressed state, and FIG. 15 is an enlarged view of circle XV of FIG. 14. During usage of the button 50, the outer surface 5102 of the button body 51 is pressed to drive the button body 51 slide, in the button groove 22, relative to the housing 20 and towards the accommodation space 205, the button body 51 drives the connecting portion 511 and the hook 512 to synchronously slide along the guide groove 23 and the accommodation groove 25 respectively; and here, the button body 51 pushes the connecting pad 56 to drive the button post 54 to slide towards the accommodation space 205 along the through hole 222 until the button post 54 abuts against a corresponding switch to turn on or off the switch; the two elastic members 57 are pressed to elastically deform, and the sealing ring 55 elastically deforms. When a pressure on the button body 51 is removed, the two elastic members 57 elastically restore to push the button body 51 to slide in a direction away from the accommodation space 205 until the connecting portion 511 is limited by the limiting boss 232 and the hook 512 is limited by the locking member 53, preventing the button body 51 from detaching from the housing 20; the connecting pad 56 is away from the button post 54, and the sealing ring 55 elastically restores to drive the button post 54 to return to an initial position, that is, the button post 54 no longer abuts against the switch.

In other implementations, the connecting pad 56 can be absent, and the button post 54 may be integrally formed with the button body 51. In some implementations, the button post 54 may be fixedly connected to the button body 51 through processes such as clamping, adhesive bonding, or screwing. Alternatively, the button post 54 may be integrally formed with the button body 51.

Figure 16:
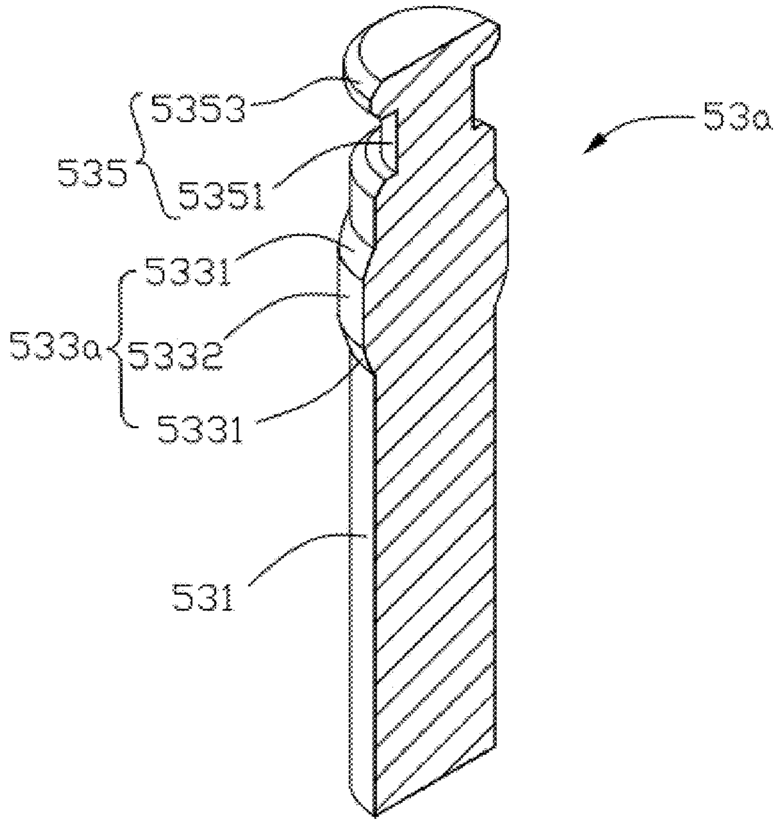
FIG. 16 is a perspective cross-sectional view of a locking member according to another implementation of the disclosure.

As illustrated in FIG. 16, FIG. 16 is a perspective cross-sectional view of a locking member according to another implementation of the disclosure. A locking member 53*a* is similar to the locking member 53 in structure except that a positioning portion 533*a* of the locking member 53*a* is provided with inclined guide surfaces 5331 respectively at two sides of the positioning portion 533*a* that are arranged opposite to each other in an axial direction of the positioning portion 533*a*. The guide surfaces 5331 facilitate the positioning portion 533*a* to penetrate into the positioning hole 252 of the housing 20. In some implementations, the positioning portion 533*a* is a protrusion surrounding one end of the outer periphery of the connecting rod 531. An axis of the protrusion is collinear with the axis of the connecting rod 531. The protrusion is provided with the guide surfaces 5331 respectively at two sides of the protrusion that are arranged opposite to each other in the axial direction of the protrusion. The positioning portion 533*a* further has a connecting surface 5332 connected between the two guide surfaces 5331, and the connecting surface 5332 is coaxial with the outer periphery of the connecting rod 531. Each guide surface 5331 is in smooth connection with the outer periphery of the connecting rod 531.

The above are only some implementations of the disclosure. It is noted that, a person skilled in the art may make further improvements and modifications without departing from the principle of the disclosure, and these improvements and modifications shall also belong to the scope of protection of the disclosure.

What is claimed is:

1. A button configured to mount to a housing of an electronic device, and slidable relative to the housing, the button comprising:

a connecting portion at one end and a hook at another end;

wherein the connecting portion protrudes from the button in a direction perpendicular to a direction in which the button is slidable;

wherein the housing defines a button groove for accommodating the button;

wherein the button groove defines a guide groove on a side wall of the button groove, the connecting portion being accommodated in the guide groove and slidable in the guide groove along with movement of the button; and wherein the hook is limited in the button groove by a locking member;

wherein the housing defines a positioning hole corresponding to the locking member, the locking member comprises a connecting rod and a positioning portion disposed on an outer periphery of the connecting rod, the connecting rod is inserted into the positioning hole, and the positioning portion is in interference fit with the positioning hole;

wherein the locking member further comprises an operating portion, the operating portion comprises an extending rod axially extending from an end surface of the connecting rod and an operating piece disposed at one end of the extending rod away from the connecting rod, and an outer diameter of the extending rod is smaller than an outer diameter of the connecting rod.

2. The button of claim 1, wherein the locking member is positioned in the positioning hole, and one end of the positioning portion is in interference fit with the positioning hole.

3. The button of claim 1, wherein an outer periphery of the positioning portion is an arc-shaped surface that protrudes outwards, and the outer periphery of the positioning portion is in smooth transition connection with the outer periphery of the connecting rod.

4. The button of claim 1, wherein an outer diameter of the operating piece is greater than the outer diameter of the extending rod, and an annular groove is defined between the operating piece and the connecting rod.

5. The button of claim 1, wherein the positioning portion is engaged with or adhered to the connecting rod so that the positioning portion is fixed to and sleeved on the connecting rod.

6. The button of claim 1, further comprising at least one elastic member disposed between the button and the housing.

7. The button of claim 1, wherein the housing defines an accommodation groove corresponding to the hook, the locking member extends through the hook and is positioned in the positioning hole, and the hook is limited in the accommodation groove.

8. The button of claim 7, wherein the positioning hole is in communication with the accommodation groove, one end of the positioning hole is defined on a top surface of the housing or a bottom surface of the housing, and the locking member is inserted into the positioning hole from the top surface of the housing or the bottom surface of the housing.

9. The button of claim 1, wherein the positioning portion is a protrusion surrounding one end of the outer periphery of the connecting rod, and the protrusion is provided with guide surfaces respectively at two sides of the protrusion that are arranged opposite to each other in an axial direction of the protrusion.

10. The button of claim 9, wherein the guide surface is in smooth transition connection with the outer periphery of the connecting rod.

11. The button of claim 1, further comprising a pressing cover that has an inner surface facing the housing, wherein the connecting portion protrudes from the inner surface of the pressing cover, the hook comprises a protruding portion protruding from the inner surface of the pressing cover and an extension portion that extends from a distal end of the protruding portion in a direction away from the connecting portion, the pressing cover, the protruding portion, and the extension portion surround a space to define a limiting groove, and the locking member extends through the limiting groove.

12. The button of claim 11, wherein two opposite end surfaces of the pressing cover are arc-shaped surfaces.

13. The button of claim 1, further comprising a button post connected to the button, wherein one end of the button post penetrates through the housing and extends into an accommodation space of the housing.

14. The button of claim 13, wherein a sealing ring is sleeved on an outer periphery of the button post.

15. The button of claim 13, comprising a connecting pad connecting the button post and the button.

16. The button of claim 15, wherein the connecting pad comprises a washer and a clamping block protruding from the washer, a positioning hole is defined on an inner surface of a pressing cover of the button and located between the connecting portion and the hook, and the clamping block is clamped in the positioning hole.

17. The button of claim 15, wherein the connecting pad is elastic, and the connecting pad is made of elastic rubber, plastic, or silica gel.

18. An electronic device, comprising:

a housing and a button;

wherein the button is mounted to and slidable relative to the housing;

wherein the button is provided with a connecting portion at one end and a hook at another end, the connecting portion protruding from the button in a direction perpendicular to a direction in which the button is slidable;

wherein the housing defines a button groove for accommodating the button;

wherein the button groove defines a guide groove on a side wall of the button groove, the connecting portion being accommodated in the guide groove and slidable in the guide groove along with movement of the button; and wherein the hook is limited in the button groove by a locking member;

wherein the housing defines a positioning hole corresponding to the locking member, the locking member comprises a connecting rod and a positioning portion disposed on an outer periphery of the connecting rod, the connecting rod is inserted into the positioning hole, and the positioning portion is in interference fit with the positioning hole;

wherein the locking member further comprises an operating portion, the operating portion comprises an extending rod axially extending from an end surface of the connecting rod and an operating piece disposed at one end of the extending rod away from the connecting rod, and an outer diameter of the extending rod is smaller than an outer diameter of the connecting rod.

19. An electronic device, comprising:

a housing and a button;

wherein the button is mounted to and slidable relative to the housing;

wherein the button is provided with a connecting portion at one end and a hook at another end, the connecting portion protruding from the button in a direction perpendicular to a direction in which the button is slidable;

wherein the housing defines a button groove for accommodating the button;

wherein the button groove defines a guide groove on a side wall of the button groove, the connecting portion being accommodated in the guide groove and slidable in the guide groove along with movement of the button; and wherein the hook is limited in the button groove by a locking member;

wherein the button further comprises a pressing cover that has an inner surface facing the housing, wherein the connecting portion protrudes from the inner surface of the pressing cover, the hook comprises a protruding portion protruding from the inner surface of the pressing cover and an extension portion that extends from a distal end of the protruding portion in a direction away from the connecting portion, the pressing cover, the protruding portion, and the extension portion surround a space to define a limiting groove, and the locking member extends through the limiting groove.

* * * * *